United States Patent [19]
Lindert et al.

[11] Patent Number: 5,494,479
[45] Date of Patent: Feb. 27, 1996

[54] DEVICE FOR BONING WINGS OF POULTRY OR THE LIKE

[75] Inventors: Heinrich Lindert, Halle; Martin Schaarschmidt, Warendorf, both of Germany

[73] Assignee: Schaartec GmbH & Co.KG, Warendorf, Germany

[21] Appl. No.: 4,977

[22] Filed: Jan. 15, 1993

Related U.S. Application Data

[63] Continuation-in-part of Ser. No. 256,300, Oct. 3, 1994.

[51] Int. Cl.$^6$ .......................... A22C 21/00; A22C 17/02
[52] U.S. Cl. .......................... 452/135; 452/136; 452/169
[58] Field of Search .................................. 452/135, 136, 452/169, 166, 138

[56] References Cited

U.S. PATENT DOCUMENTS

| | | | |
|---|---|---|---|
| 2,893,051 | 7/1959 | Massengill | 452/136 |
| 3,296,654 | 1/1967 | Segur | 452/136 |
| 3,470,581 | 10/1969 | Hopkins | 452/136 |
| 3,510,908 | 5/1970 | Segur et al. | 452/136 |
| 4,207,653 | 6/1980 | Gasbarro | 452/136 |
| 4,377,884 | 3/1983 | Viscolosi | 452/136 |
| 4,811,457 | 3/1989 | Lindert | 452/136 |
| 4,932,102 | 6/1990 | Hazenbroek et al. | 452/136 |
| 4,993,113 | 2/1991 | Hazenbroek | 452/136 |
| 5,071,388 | 12/1991 | Lindert et al. | 452/136 |
| 5,173,076 | 12/1992 | Hazenbroek | 452/135 |
| 5,232,397 | 8/1993 | Gagliardi et al. | 452/135 |

FOREIGN PATENT DOCUMENTS

| | | |
|---|---|---|
| 0439780A | 8/1991 | European Pat. Off. . |
| 2227827 | 5/1973 | France . |
| 2566629 | 1/1986 | France . |
| 2047772 | 3/1972 | Germany . |
| 8302495 | 7/1983 | Netherlands . |
| 2124883 | 2/1984 | United Kingdom . |

*Primary Examiner*—Willis Little
*Attorney, Agent, or Firm*—Knobbe, Martens, Olson & Bear

[57] ABSTRACT

This invention provides an apparatus for deboning animal extremities, such as poultry wings. The apparatus comprises means for transporting the extremity; means for cutting the bones of said extremity in a direction transverse to their longitudinal axes; and means for removing bones from said extremity in the direction of said axes. The bones may be separated from the meat by retaining the meat while pulling or pushing the cut bones therefrom. For deboning poultry wings, the apparatus preferably comprises two cutting discs or blades that cut the wing on either side of the joint to allow the joint to be disposed and the remainder deboned by removing the bones therefrom.

33 Claims, 10 Drawing Sheets

DEVICE FOR BONING WINGS OF POULTRY OR THE LIKE

RELATED APPLICATIONS

This application is a continuation-in-part of application Ser. No. 08/256,300, filed Oct. 3, 1994 pending by the same inventor, which is the U.S. national phase of PCT application No. PCT/EP93/02922, filed Oct. 22, 1993 naming the same inventor, which is based upon European application No. EP 92 11 8133.5 filed Oct. 23, 1992 by the same inventor.

BACKGROUND OF THE INVENTION

1. Field of the Invention

This invention relates to a device for boning (dissociating meat from) poultry wings that are naturally equipped with ulna and radius as bones.

2. Description of the Prior Art

As a consequence of the naturally complicated structure of chicken, duck or other poultry wings that have two thin bones, namely ulna and radius, there has so far been no device for mechanically dissociating the wing meat from the two interconnected bones in a satisfactory way. These two bones are not used by the final consumer and are therefore of great disadvantage to the sale of meat (which meat is desired without bones by the consumer) due to the increase in weight and package.

As far as it is already known that leg bones (drumstick bones) are mechanically removed from poultry meat, a device of the prior art is equipped with a rotating chain which carries holding means with gripping arms for each leg passing through a cutting station in cycles. In this cutting station the bone is severed in its longitudinal direction by means of a saw. As a result, the divided meat can be dissociated more easily.

Since a longitudinal severing operation is not possible with thin poultry wings, known devices are thus of no use.

SUMMARY OF THE INVENTION

It is the object of the present invention to provide a device for boning wings of poultry or the like, with the relatively thin bones (ulna and radius) being mechanically removed from the poultry meat during passage or in a cycle process and the subdivided bone parts being then ejected automatically.

In a poultry boning device having holding means arranged on a transporting means which rotates in endless fashion within a machine frame, the holding means are equipped in accordance with the invention with a respective transverse reception means for receiving a wing, said means passing through a cutting station which divides the wing bones in a direction transverse to the longitudinal direction thereof and includes two cutting means rotating in the direction of movement and said means subsequently passing through a separating means dissociating the meat or the like from the bone.

After the wing bones have been cut through in a direction transverse to the longitudinal direction thereof, the resultant three bone pieces are each stripped of meat and skin individually by means of the separating means and are subsequently ejected.

The wing bones may preferably be removed individually from the meat by means of gripping pliers, or they may be pressed out of the meat by means of abutment plates which are preferably perforated and by means of rams extending therethrough with the aid of pressure acting on the ends of the wing bones.

A preferably U-shaped reception pocket whose inner walls support or clamp the wing between the vertical side walls thereof, optionally with the aid of a holding strip at the upper side, may be arranged as a holding means for the wing.

Perforated plates which are movable relative to each other and whose holes respectively correspond to the diameter of the wing bones may be provided as separating means.

In another preferred embodiment a displaceable abutment plate which presses against the one free end of the bone part and thus displaces the same, e.g., by 20 mm is laterally provided for pulling the tendons off from the bone periphery.

Furthermore, lateral stops may be provided for limiting the lateral displacement of the severed bone ends.

The separating knives which dissociate the meat are arranged above this U-shaped and preferably rotatably mounted reception pockets and may have straight or bent blades. The blades may also be concave so as to be matched to the round shape of the bones. The separating knives may also serve as grippers in the case of blades that are pressed back into their slit-shaped reception means. These grippers are capable of removing the thickened cut end parts of the bones from the meat. To this end, the blades are each supported in the slit-shaped reception means on an inner pressure spring by which the blades are supported in a flexibly displaceable way.

Further features become apparent from the sub-claims.

The scope of protection covers not only individual features, but also the combination thereof.

DESCRIPTION OF THE DRAWINGS

Embodiments of the invention are illustrated in the drawings, in which:

FIG. 2 is a lateral view of a poultry wing to be boned in its stretched position;

FIG. 6c is a cross-section according to arrow direction VIa in FIG. 6a illustrating the separating knives shortly before their action on the bones of the lower wing in a simplified representation in comparison with FIG. 6a;

FIG. 6d is a cross-section according to FIG. 6c, but with separating knives contacting the bone of the lower wing, the figure being also a simplified representation in comparison with FIG. 6a;

Figure 2:
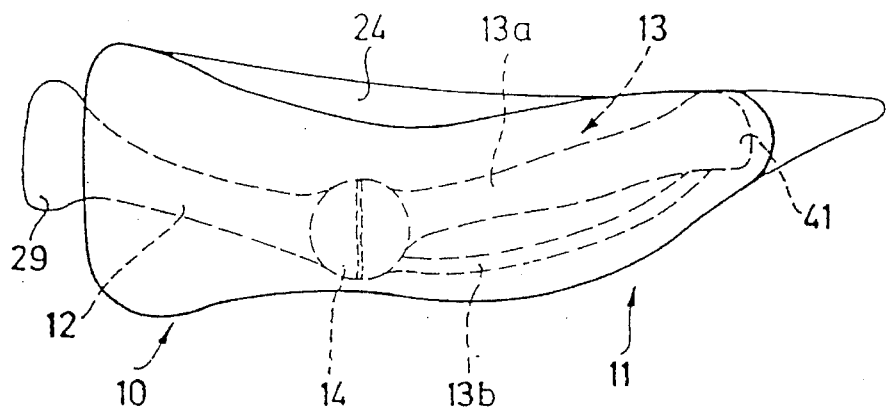
FIG. 2.
Figure 1A:
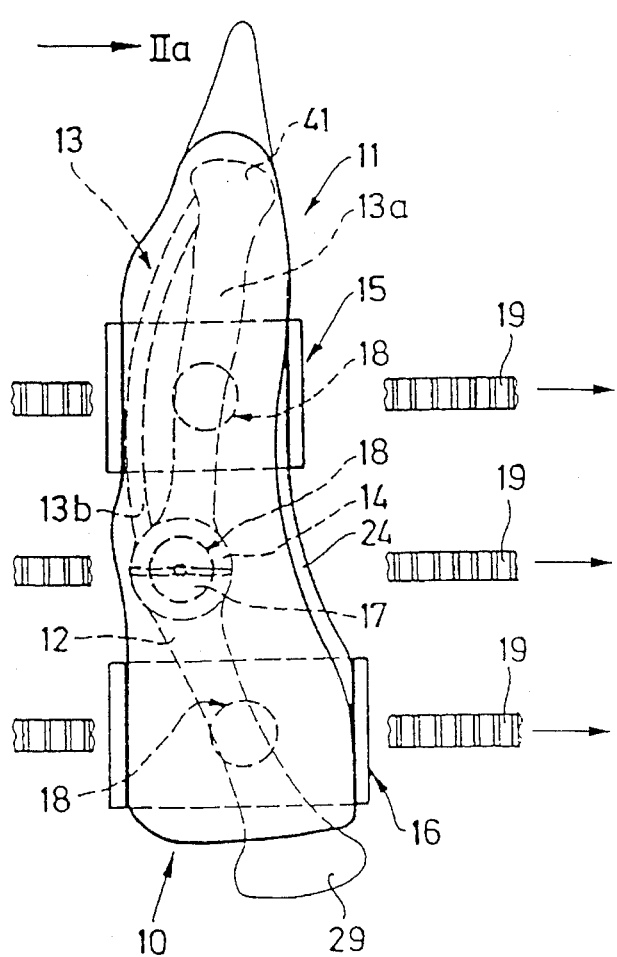
FIG. 1a is a top view on the same wing in a transportable reception means.
Figure 1:
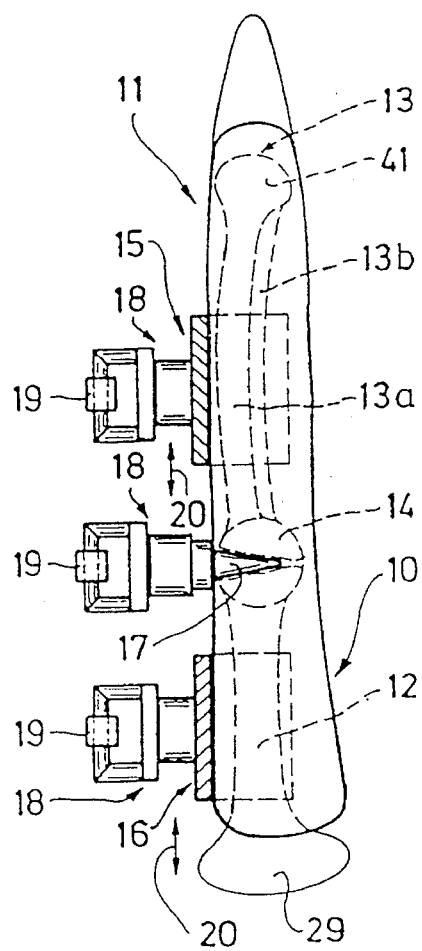
FIG. 1 is a lateral view (according to the arrow direction in FIG. 1a) of a wing with bones according to FIG.

A poultry wing to be boned comprises an upper wing piece (10) and a lower wing piece (11). The meat of the upper wing piece (10) surrounds a so-called upper wing bone (12) whereas the meat of the lower wing piece (11) surrounds a bipartite lower wing bone (13) which naturally comprises an ulna (13a) and a radius (13b). The upper wing bone (12) on the one hand and ulna (13a) and radius (13b) of the lower wing bone (13) on the other hand are movably connected to each other via a joint (14).

The processing device for deskeletonizing poultry wings which are equipped with ulna and radius includes a rotating transporting chain (19) of a bottom transportation means with holding means (18) and reception pockets (15, 16) held by said holding means and a middle centering mandrel (17) thereinbetween, with said assembly passing through a cutting station (21) with separating knives (43, 44, 49, 50 and 35).

Figure 6A:
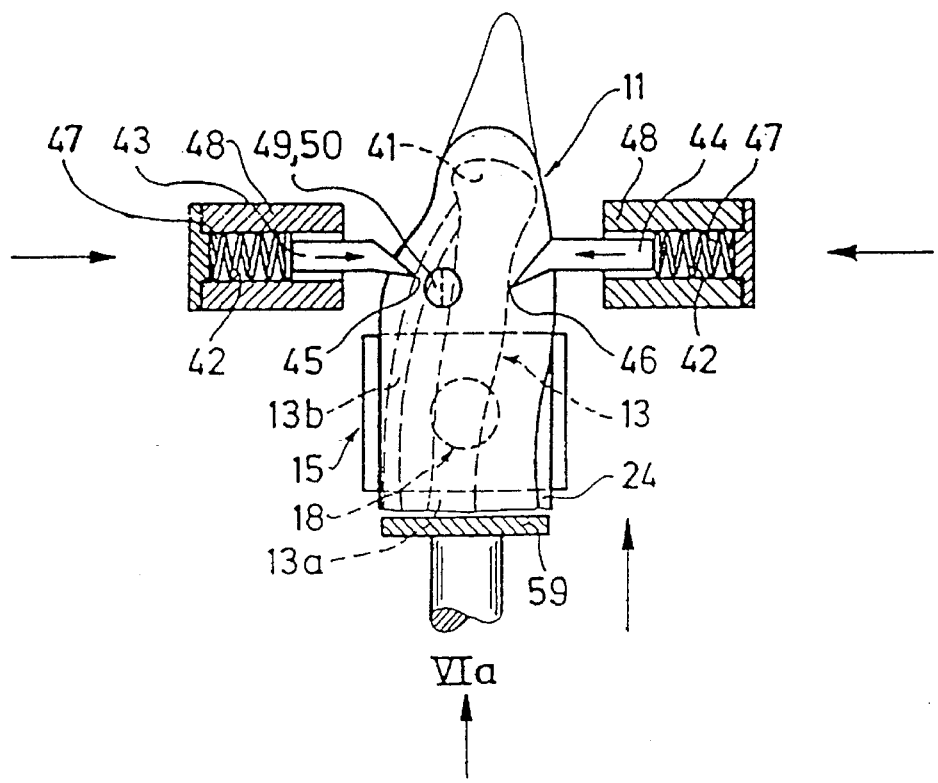
FIGS. 6a–6b are a top view according to FIG. 5, without illustration of the middle wing piece, with separating knives acting on both upper wing and lower wing.
Figure 6B:
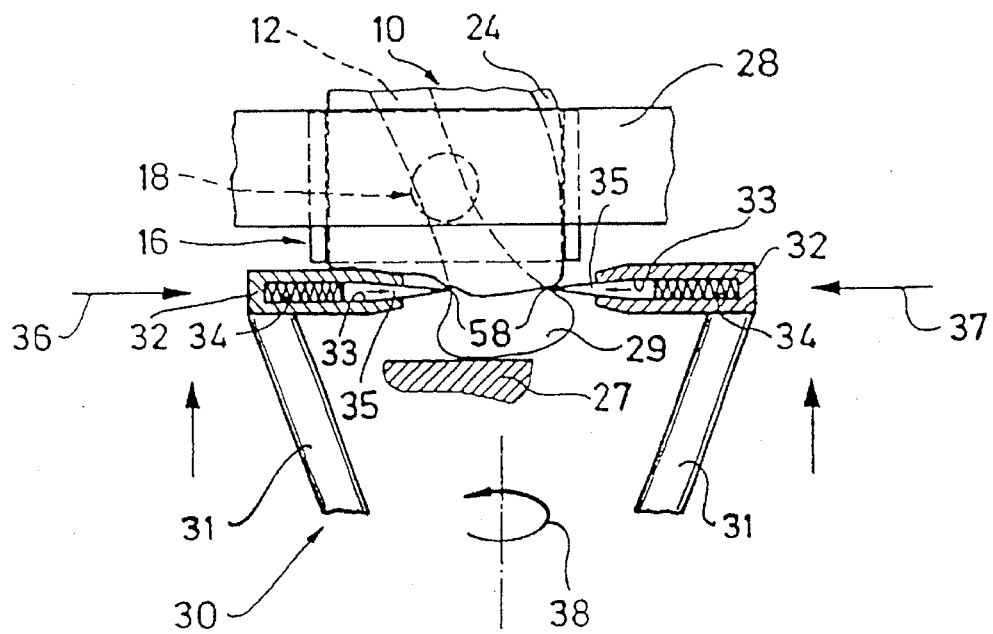
Figure 6C:
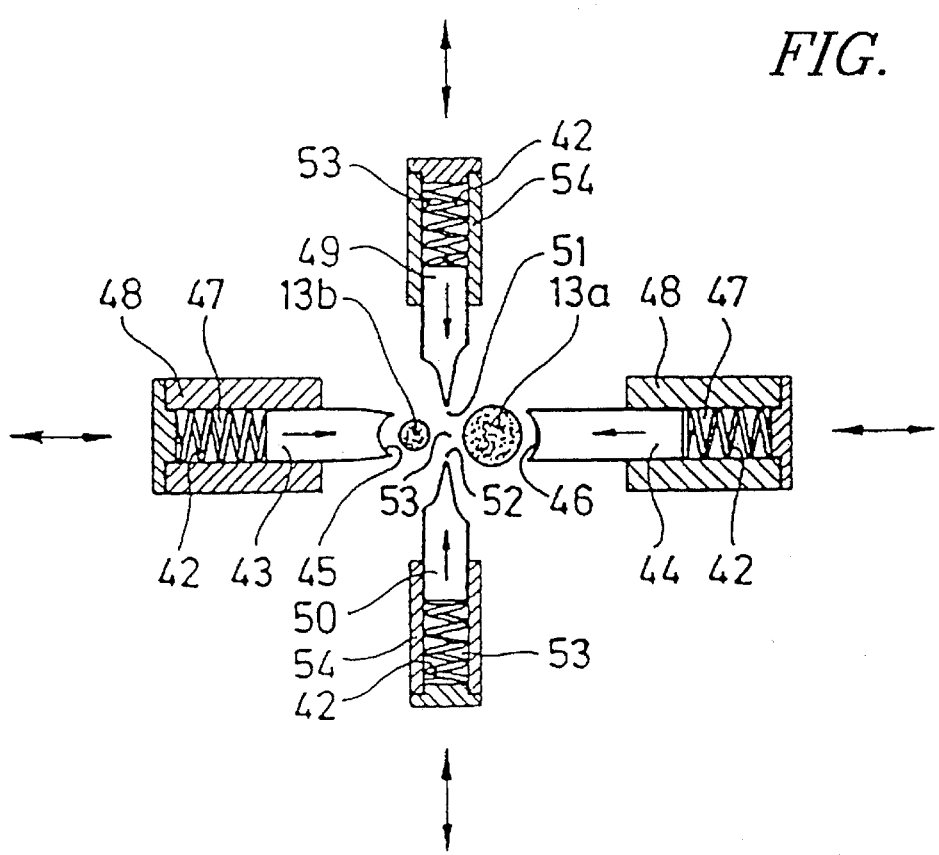

Cutting station (21) carries lateral opposite stops (26, 27) and an upper retaining strip (28). Furthermore, there are provided lateral grippers (30) with gripper heads (32) on movable grippers arms (31) for holding the bone to be processed and for pulling the same from the surrounding meat. Furthermore, rotating cutting knives (22) are provided for transversely dividing the bone into a plurality of pieces. The separating knives (43, 44, 49, 50) which are opposite each other in pairs (FIGS. 6c, 6d) are displaceably mounted in the cutting station for removing the meat from the bones.

A lateral abutment plate (59) is also supported in a displaceable way and has the function to displace the separated bone piece (13) by 10 to 20 mm for tearing out the meat tendons.

To remove bones (12, 13) from the meat, the wings are inserted into two reception pockets (15, 16) that are spaced apart from each other at a specific distance (FIGS. 2–7). These reception pockets (15, 16) have an approximately U-shaped cross-section which can thus be adapted to the anatomical shape of the wing. The reception pockets may be supported in a rigid way or preferably in a slightly rotatable way on the transportation system.

Centering mandrel (17) is arranged between the two reception pockets (15, 16) at a distance from reception pocket (15) and also at a distance from reception pocket (16). The tip of this centering mandrel (17) is oriented in an exactly opposite direction with respect to the insertion direction of the wing into reception pockets (15, 16). Reception pockets (15, 16) and centering mandrel (17) are connected via holding means (18) or the like in known fashion to a transporting means, such as an endless rotating chain (19), belt or the like.

A wing is inserted into the reception pockets (15, 16) in such a way that joint (14) is spitted onto the centering mandrel (17) during the insertion operation. When the wing is inserted into these reception pockets (15, 16), the longitudinal bone direction of both the upper wing bone (12) and the lower wing bone (13) extends approximately at a right angle (horizontally) relative to the transportation direction (19) of the transporting chain or the like. These reception pockets (15, 16) are arranged on the transporting means in such a way that they are displaceable in a direction perpendicular to the transportation direction of the transporting chain (19) or the like in accordance with arrow direction (20).

Figure 3:
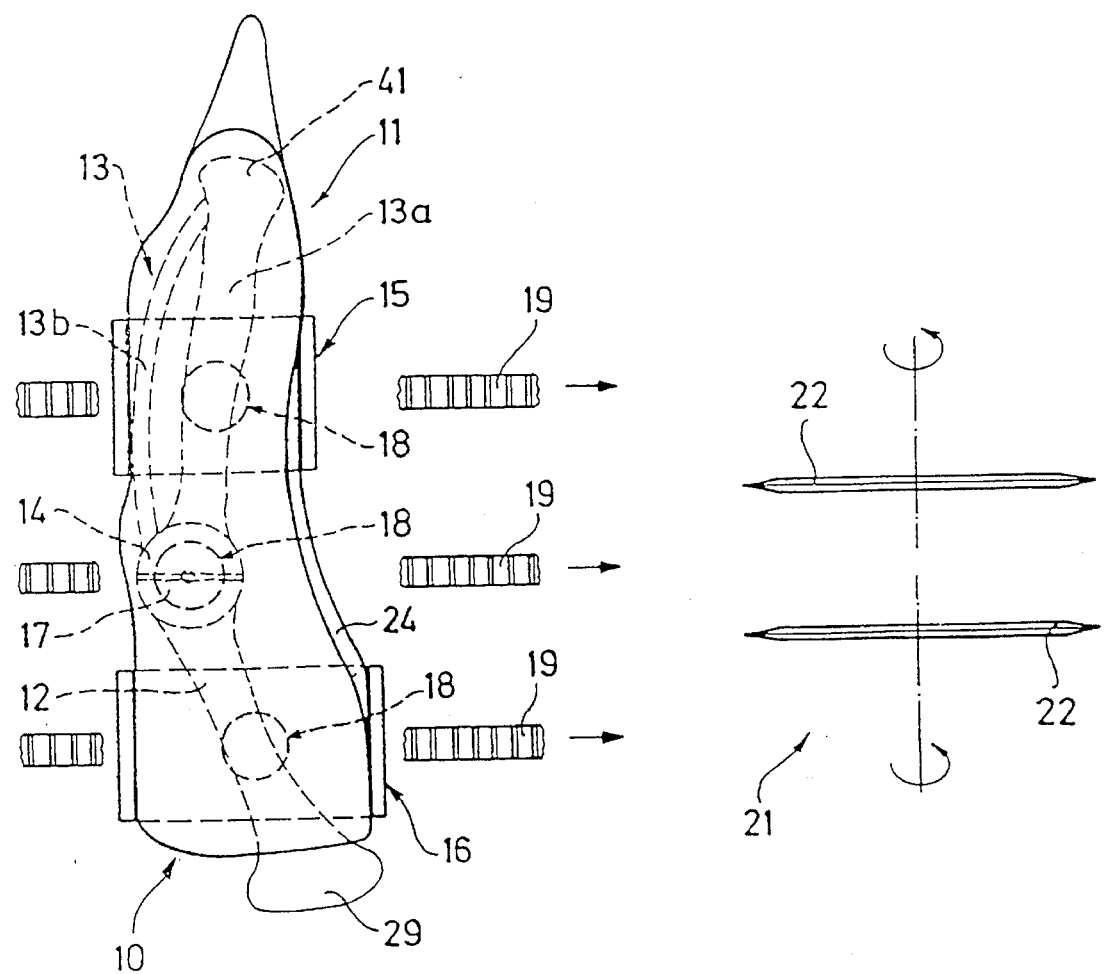
FIG. 3 is a top view on the same wing according to FIG. 1a but shortly before its entry into a cutting station.
Figure 4:
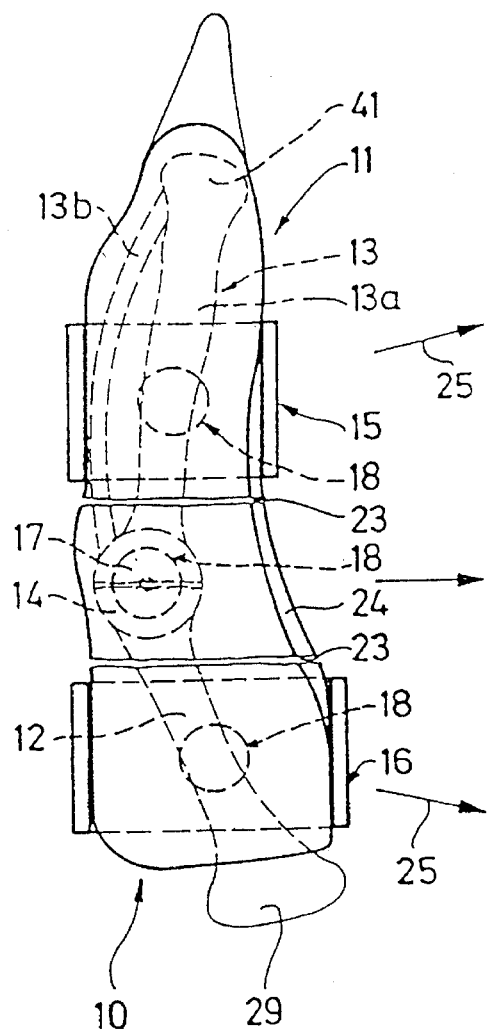
FIG. 4 is a top view on the same wing according to FIG. 3 after its passage through the cutting station.
Figure 5:
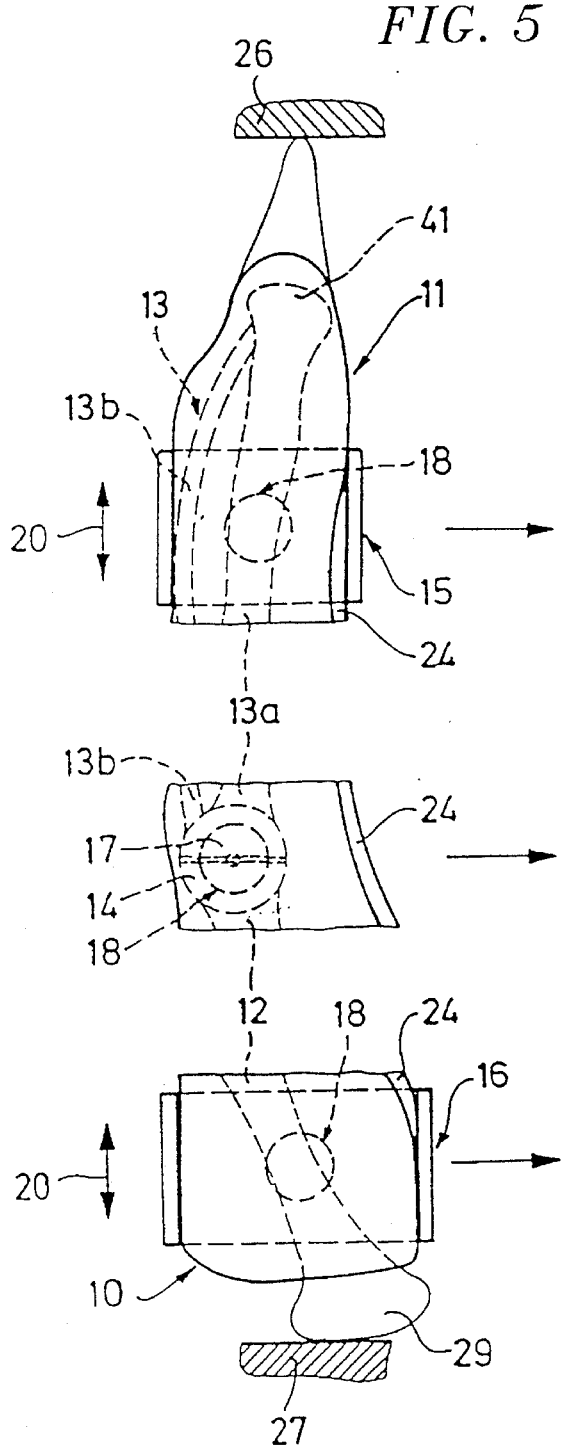
FIG. 5 is a top view on the same wing according to FIG. 4, with the individual wing parts assuming a separate position differing from the one of FIG. 4 for further processing.

In this position of the wing that is locally defined by the centering mandrel (17) and the reception pockets (15, 16), the wing is supplied to a cutting station (21) (FIG. 3). The cutting station (21) may be supported in a stationary way and may consist of circular cutting knives (22), saw blades or the like. The rotational direction of the cutting knives (22) is preferably opposite to the transportation direction of the transporting chain (19). During passage through the cutting station (21), cuts (23) are made above and below joint (14) when being viewed in the longitudinal bone direction. As a result of these cuts, joint (14) is severed from the wing. Furthermore, an outer connection skin (24) is separated between upper wing piece (10) and lower wing piece (11).

It is only after the separating cut that the reception pockets (15, 16) assume their vertical position (erection) with the aid of a suitable moving means.

The upper wing piece (10) and the lower wing piece (11) are now subjected to another processing step. Joint (14) which is covered by adhering skin residues may here be regarded as a waste product which need no longer be processed in a further step.

After cut (23) has been made, the upper wing piece (10) and the lower wing piece (11) are further transported opposite to each other and diagonally to the outside, i.e. away from joint (14) in accordance with arrow direction (25) and seated in their reception pockets (15, 16), until each of them abuts on a lateral outer stop (26 and 27 respectively). A possible lateral and continued transportation of the wing pieces (10, 11) is stopped due to the abutment of the lower wing piece (11) and the upper wing piece (10) on the respective lateral outer stops (26 and 27): Both the lower wing piece (11) and the upper wing piece (10) have reached the initial position required for further processing. This further processing starts after wing pieces (10, 11) have abutted against the lateral stops (26, 27) and after the transportation stop of the wing pieces (10, 11) caused thereby.

During its transportation in arrow direction (25) the upper wing piece (10) is moved below the upper retaining strip (28) or the like, the end position of the upper wing piece (10) below said retaining strip (28) being reached when the upper wing piece (10) abuts on a lateral stop (27). The position of the upper wing piece (10) is fixed by said upper retaining strip (28), which is necessary for further processing.

The bone ball (29) of the upper wing bone (12) at the end side is gripped from behind by a gripper (30) which is shaped in the form of pliers. This gripper (30) has, for instance, two gripper arms (31) that are opposite each other and rotate about a horizontal axis and on whose one end a respective gripper head (32) is arranged. The longitudinal directions of gripper arm (31) and gripper head (32) are at an angle to each other. Gripper head (32) has a reception recess (33) extending, for instance, in the longitudinal direction thereof. A knife (35) which is biased by a pressure spring (34) is supported in this reception recess (33) in a laterally displaceable way. Knife (35) can be displaced in the transportation direction of the transporting chain (19) and in a direction opposite thereto, as shown in FIG. 3. The vertical blade (58) of knife (35) is of a straight configuration, but may also have a concave shape. When being closed, i.e. during movement of the gripper arm (31) and thus of the gripper head (32) in arrow direction (36) and in arrow direction (37), respectively, knives (35) come to rest on the upper wing bone (12), thereby gripping the bone ball (29) from behind. The closed gripper (30) which is shaped in the form of pincers and biased to a certain degree is now rotated according to arrow direction (38) about a horizontal axis. As a result, the meat is somewhat dissociated from the bone, which facilitates subsequent removal of the bone (12) from the upper wing piece (10). A stripper plate (39) (FIG. 7b) or the like is slid between gripper head (32) and the meat of the upper wing piece (10) after termination of the rotational movement of gripper (30) which is shaped in the form of pliers. The stripper plate (39) has the function to retain the meat during removal of the upper wing bone (12) from the upper wing piece (10) by gripper (30). Stripper plate (39) may also be arranged in a stationary way. In this case the upper wing piece (10) would be moved with its upper wing bone (12) into the stripper plate (39).

Figure 7A:
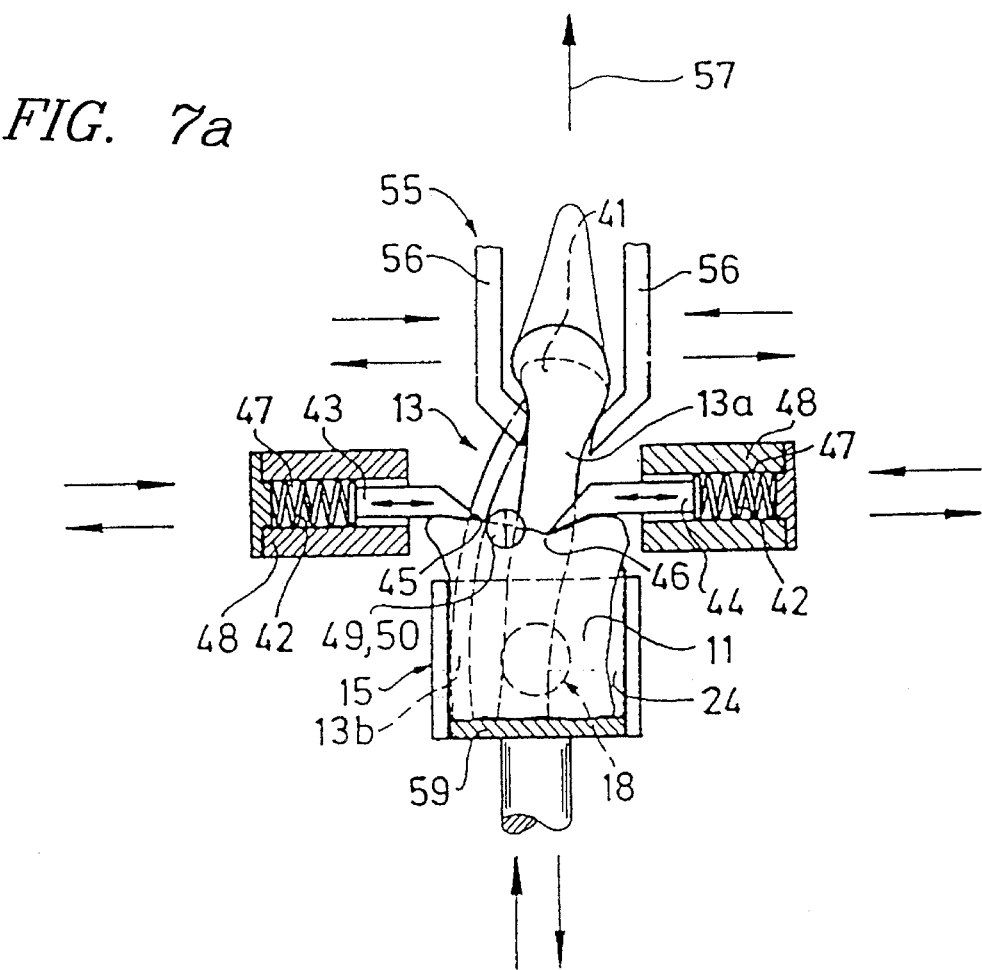
FIGS. 7a–7b are a lateral view with a section of lower wing and upper wing according to FIGS. 6a, 6c and 6d, but with gripping pliers resting on the bones for removing the latter.
Figure 7B:
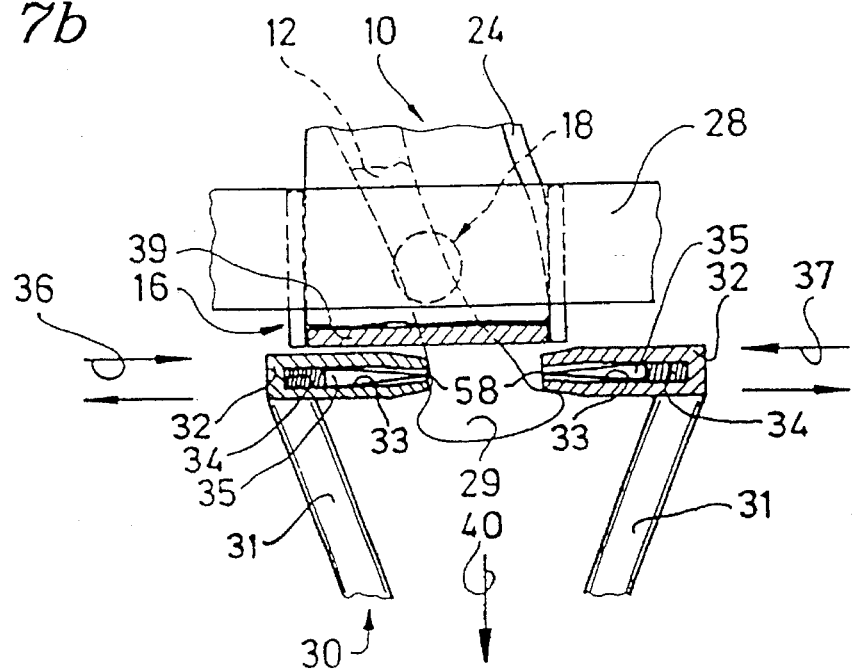

After the stripper plate (39) has been moved into position, gripper (30) which is shaped in the form of pliers is closed to a greater extent, i.e. the gripper arms (31) are further moved to each other to assume approximately the position shown in FIG. 7. After this position has been reached, gripper (30) is displaced according to arrow direction (40) until it assumes the position shown in FIG. 8, i.e. until the upper wing bone (12) is fully removed from the upper wing piece (10). The meat of the upper wing piece (10) is now subjected to further processing, e.g., for making poultry sausage, poultry liverwurst or other delicatessen.

During this operation stop (26) must be removed from the path of movement.

Ulna (13a) and radius (13b), which jointly form the lower wing bone (13), are removed from the lower wing piece (11) at the time when the upper wing bone (12) is removed from the upper wing piece (10).

As illustrated in FIGS. 6a–6d four separating knives (43, 44) that are each under the action of a pressure spring (42) are operative below a bone ball (41) of the lower wing bone (13) in the area of ulna (13a) and radius (13b).

Out of two opposite and spaced-apart separating knives (43, 44), the one separating knife (43) is pressed under great pressure against the radius (13b) of the wing bone (13) from the outside. Another separating knife (44) is simultaneously pressed against the ulna (13a) of the lower wing bone (13), also under great pressure. The cutting geometry of said two separating knives (43, 44) is preferably concave. The blades (45, 46) of this shape therefore come to rest on ulna (13a) and radius (13b) of the lower wing bone (13) in such a way that they surround the same in an arcuate manner. The separating knives (43, 44) move towards the respective bones in, and opposite to, the transporation direction of the transporting chain (19). The separating knives (43, 44) are mounted in laterally displaceable fashion in the reception recess (47) of a respective reception housing (48) under the action of the above-mentioned pressure spring (42). To be able to dissociate the meat between ulna (13a) and radius (13b), additional separating knives (49, 50) are introduced into this area according to the illustration of FIGS. 6a, 6c, 6d 6b directly below the bone ball (43) vertically and at a right angle from both "the bottom" and "the top". These separating knives (49, 50) are preferably shaped like a wedge, their tips (51 and 52) respectively penetrating into the free space (53) formed between ulna (13a) and radius (13b). These separating knives (49, 50) overlap each other in this state according to the illustration of FIG. 6d and are each positioned on a part of the cross-sectional periphery of ulna (13a) and radius (13b). Hence, these separating knives (49, 50) simultaneously serve as counter-holders or as so-called "counter-pressure means" for the other separating knives (43, 44) already moved into their position previously.

Figure 6D:
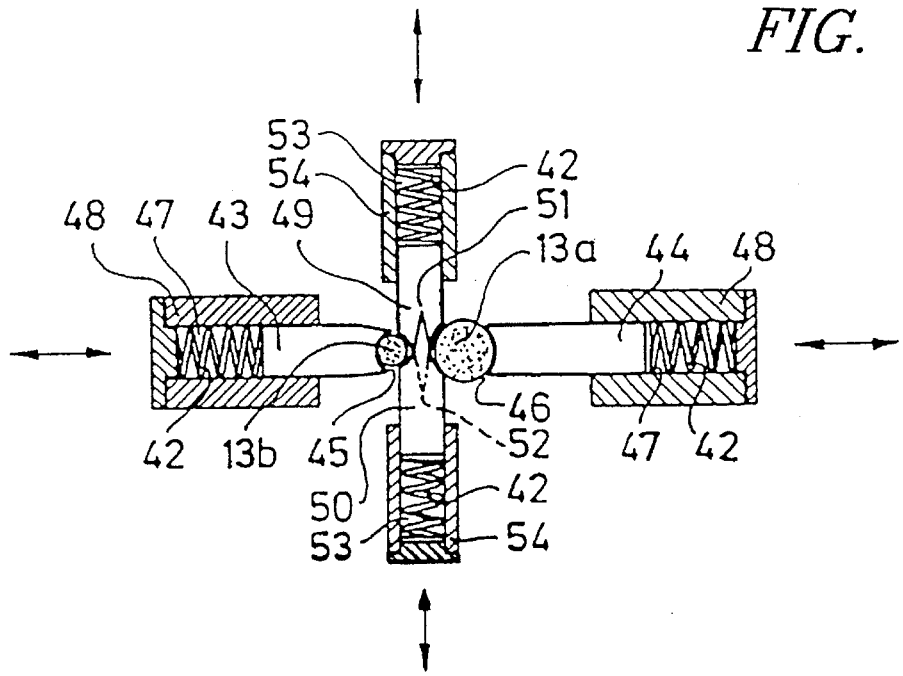

The other separating knives (49, 50) that are biased by the pressure springs (42) to a certain degree are each displaceably supported in a reception recess (53) of a reception housing (54) according to the insertion direction between ulna (13a) and radius (13b). The meat of the lower wing piece (11) is pressed back, approximately as shown in the illustration of FIG. 7, in a direction perpendicular to the transporation direction of transporting chain (19) due to the introduction of the separating knives (43, 44, 49, 50) as shown in FIGS. 6d and 7.

When the separating knives (43, 44, 49, 50) are in position, according to the representation in FIGS. 6 and 7, ulna (13a) and radius (13b) and thus the entire lower wing bone (13) are displaced in the longitudinal direction of the lower wing bone by about 20 mm to the outside at a right angle and vertically opposite to the transportation direction of transporting chain (19). An abutment plate (59) which is moved, e.g., pneumatically or in a similar way, into the reception pocket (15) according to the illustration of FIG. 7 is used for displacement. During this displacement movement the tendons and the meat of the lower wing piece (11) are retained by the separating knives (43, 44, 49, 50) while the bones are pressed further to the outside, preferably for about a third of their length.

After this operation has been ended, the bone ball (41) of the lower wing bone (13) is gripped from behind by so-called gripping pliers (55). The gripping pliers (55) are closed, thereby assuming the position shown in FIG. 7. The two gripper arms (56) of these gripping pliers (55) directly rest on ulna (13a) and radius (13b) below the bone ball (41) of the lower wing bone (13). The gripping pliers (55) are now moved in a direction corresponding to arrow direction (57), so that the whole bone of the lower wing (13) is removed from the lower wing piece (11).

Figure 8A:
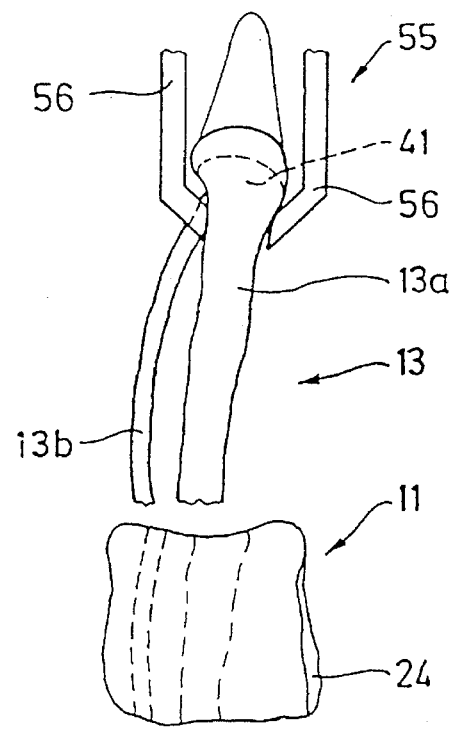
FIGS. 8a, 8b are a view of the end products of the poultry wing to be subjected to further processing.
Figure 8B:
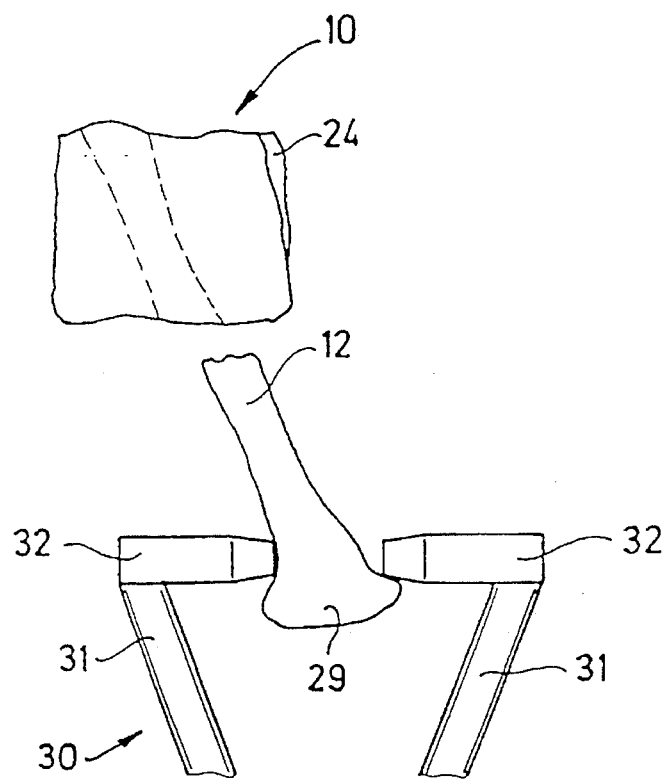

The two aforementioned operations, i.e. removal of the upper wing bone (12) and of the lower wing bone (13) are carried out at the same time, so that after the removal of these two bones the meat of both the upper wing piece (10) and the lower wing piece (11) is available for further processing in accordance with the illustration of FIG. 8.

The above-described deskeletonization of poultry wings is preferably applied to turkeys. It is however possible to deskeletonize the wings of other poultry types, i.e. those of chicken, roosters, ducks, geese, phesants, etc. Moreover, the device is also suited for deskeletonizing corresponding extremities of other animals, such as hares, rabbits, etc.

Another embodiment of the invention is illustrated in drawing 10 et seq.

Reference numeral (60) designates an upper wing piece and reference numeral (61) a lower wing piece of a poultry wing. These pieces are folded against each other in such a way that the connecting joint (64) is at one end and a bone ball (81) at the opposite end of ulna (63a) and radius (63b) of the lower wing bone (63), and another bone ball (79) of the upper wing bone (62) projects at the other side. The lower wing bone (63) and the upper wing bone (62) are approximately in parallel and are also surrounded by the meat and skin (64a) thereof.

The wing to be deskeletonized is prepared for boning in that its wing tip (not shown) that is not to be used is cut off in a preceding operation.

A mechanical processing device for boning folded upper and lower wing pieces (60, 61) of this type has rotating endless transporting chains (69) within a machine frame (89) at the bottom side, like in the embodiment illustrated in FIGS. 1–8, with a suitable drive and guides (not shown) and includes holding means (68) and reception pockets (65) held thereby. These are mounted on the transporting chain (69) in such a way that they are easily pivotable (rotatable) or can be displaced in a direction perpendicular to the transportation direction.

Figure 9:
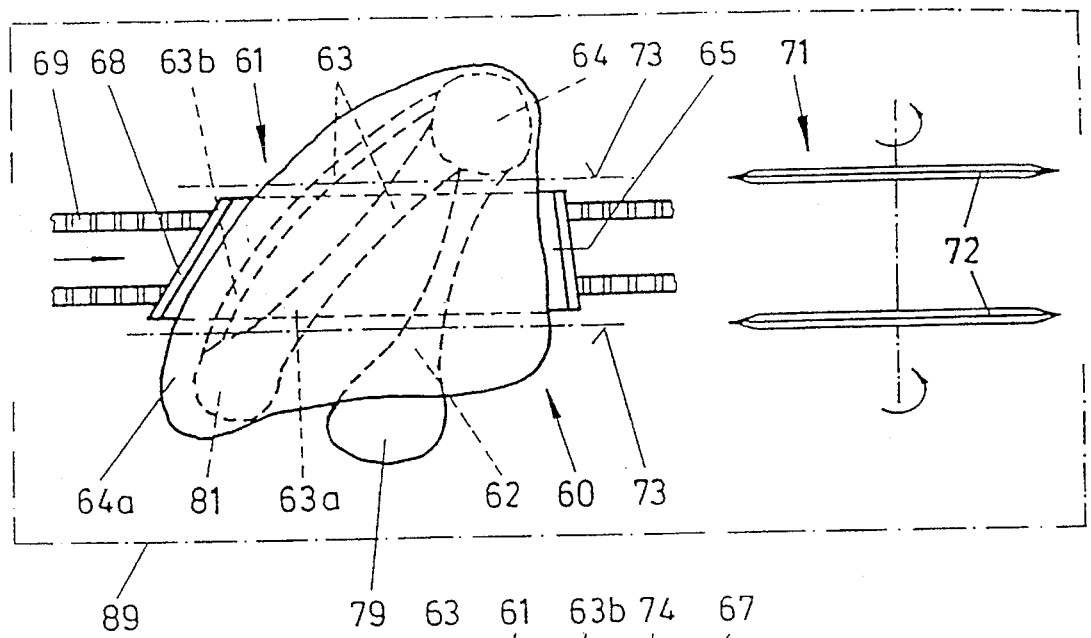
FIG. 9 is a diagrammatic top view on a reception pocket with inserted folded upper wing and lower wing and a bone separating means.
Figure 10:
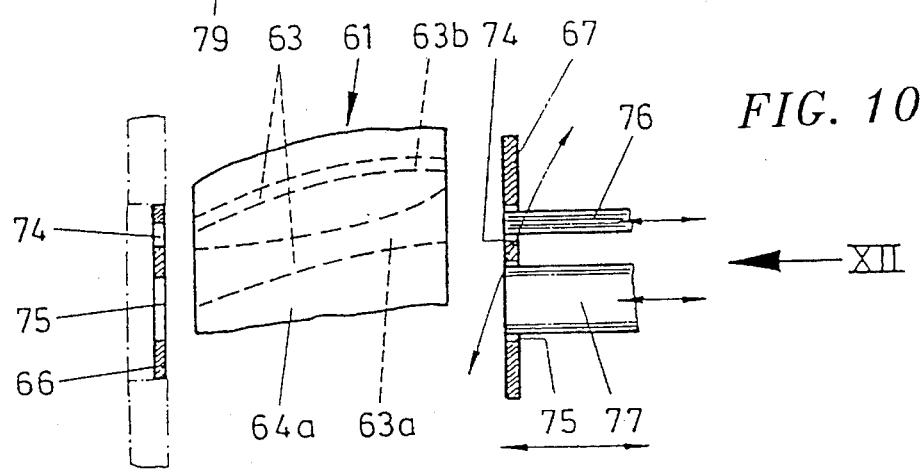
FIG. 10 is a diagrammatic lateral view of a dissociating (separating) means for pressing the lower wing bone out of the surrounding meat, said means comprising two perforated plates with two respective holes and two rams on a perforated plate.
Figure 11:
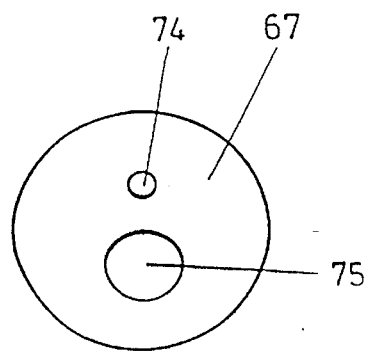
FIG. 11 is a top view (front view) according to arrow direction II on the perforated plates according to FIG. 11.

To remove the joint (64) and the bone balls (79, 81) from the wing bones (62, 63), the reception pocket (65) extends longitudinally at an angle of 30° to 50° (FIG. 9) relative to its motional direction, and the pieces are thus treated by a cutting station (71) which severs the joint (64) and the bone balls (79, 81) as waste in parallel oblique cuts (73) (relative to the longitudinal direction of the wing bones). To this end, each reception pocket (65) has an approximately U-shaped cross-section which can thus be adapted to the anatomical shape of the flat wing. An upper retaining strip (not shown) or the like may rest on the bones and the meat in such a U-shaped holding pocket (65) for retaining the folded wing bones (62, 63) during cutting.

This cutting station (71) is equipped with two separating knives (72) rotating in parallel with each other, e.g. in the form of circular saw blades which rotate, in a direction opposite to the direction of movement of the reception pocket (65), about a common driven shaft which is stationarily supported within the machine frame (89).

The length of the reception pocket (65) is smaller than the distance between the two separating knives (72). As a result, the wing bones (62, 63) continue their travel after the separating operation whereas the bone balls (79, 81) on the one hand and the joint (64) on the other hand drop down due to gravity and can be removed from the machine.

Figure 16:
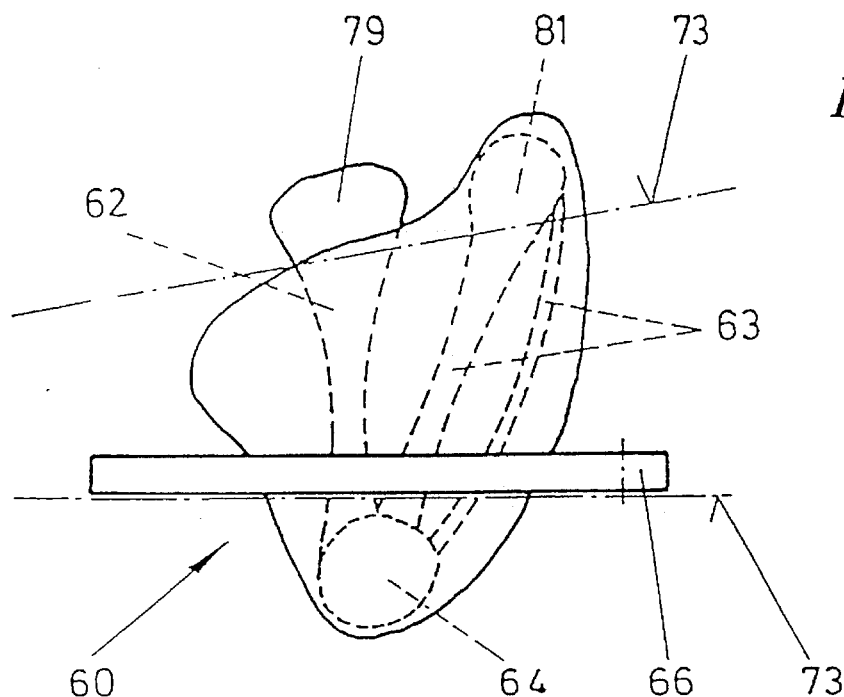
FIG. 16 is a lateral view of a wing bone with surrounding meat and with a clamp holding the same and with cuts made by two endless saw blades.

However, this cutting station (71) may preferably be equipped with two rotating saw belts (not shown) that are arranged one after the other to rotate at an acute angle to each other and sever joint (64) on the one hand and bone balls (79, 81) on the other hand at different cutting angles relative to the longitudinal bone direction and one after the other (FIG. 16).

After the oblique cut (73) has been made, the cut lower wing bones (63a, 63b) and the upper wing bone (62) are supplied to a dissociating means (70) acting as a separating means for meat, skin, etc. This means is equipped with two perforated plates (66, 67) that are displaceable relative to each other and include two holes (74, 75) (FIGS. 10–12 and 15) whose diameter corresponds to the outer diameter of ulna (63a) and radius (63b) of the lower wing bone (63).

The closely surrounding inner edges of the holes (74, 75) tear off the meat, the tendons and the connecting skin from the two bones (63a, 63b) due to the movement of the perforated plates (66, 67) relative to each another and first press the same together (FIGS. 12 and 15) whereas the dissociated bones (63) projecting from the perforated plates (66, 67) can be removed by hand or by means of lateral grippers.

Figure 13:
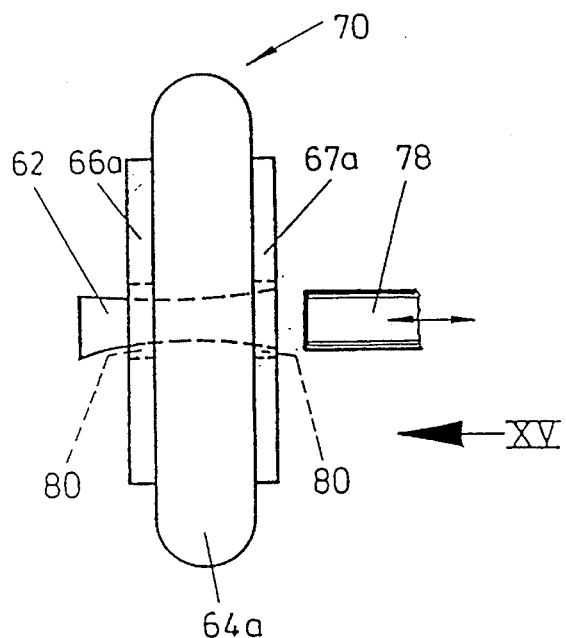
FIG. 13 is a diagrammatic lateral view of a dissociating means which presses the upper wing bone out of the surrounding meat and includes two perforated plates with a respective hole and ram according to FIG. 14.
Figure 14:
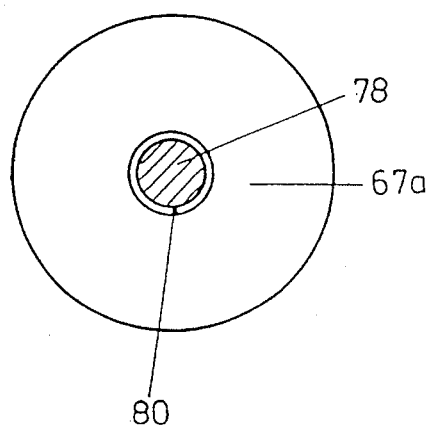
FIG. 14 is a diagrammatic front view, according to arrow direction VI, of a movable perforated plate with a hole and a ram according to FIG. 14.

In the embodiment of the perforated plates (66, 67), as is shown in FIGS. 13 and 14, only one hole (80) is provided in the perforated plates (66, 67) through which the upper wing bone (62) is pressed, with the inner edge of the hole respectively acting as a stripper surface.

The one perforated plate (19) is preferably fixedly arranged and the other perforated plate (67) is movably supported relative thereto.

Furthermore, instead of one perforated plate with a specific diameter corresponding to the bone diameter, two perforated plates with increased holes are preferably supported adjacent to each other, the effective hole diameter being changeable in a variable way by displacing said perforated plates in one plane so as to achieve an excellent separating action of the inner edges.

To remove the various wing bones (62, 63) by a pressing operation, the perforated plates (66, 67) have arranged upstream thereof driven rams (76–78) which reciprocate in a direction perpendicular thereto and abut on the front faces of the bones (62, 63) and press the same (see motion arrows) through the holes (74, 75, 80) of the perforated plates (66, 67), whereby the dissociating meat (64a), etc. is compressed into a removable piece of meat also with the aid of the moving perforated plate (77). This meat can then be delivered to the consumer in any desired specification.

Figure 17:
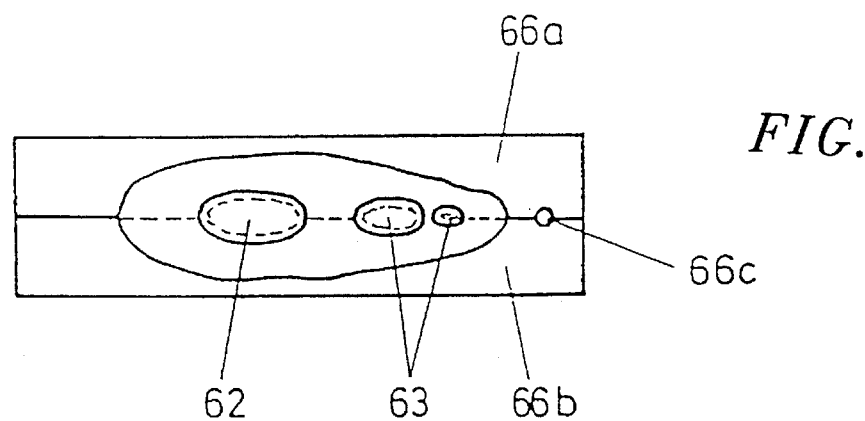
FIG. 17 is a top view on the clamp with meat and bone.
Figure 18:
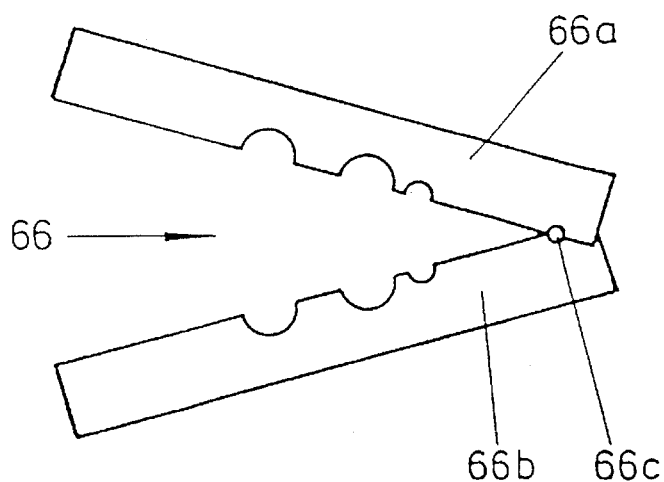
FIG. 18 is a top view on an opened clamp.

In a slightly modified embodiment (FIGS. 16–18), a divided plate (66a, 66b) may be used as a clamp instead of a one-part perforated plate (66). This clamp surrounds the wing bones (62, 63) from both sides, with a hinge (66c) holding the two perforated plate halves (66a, 66b) together.

Figure 12:
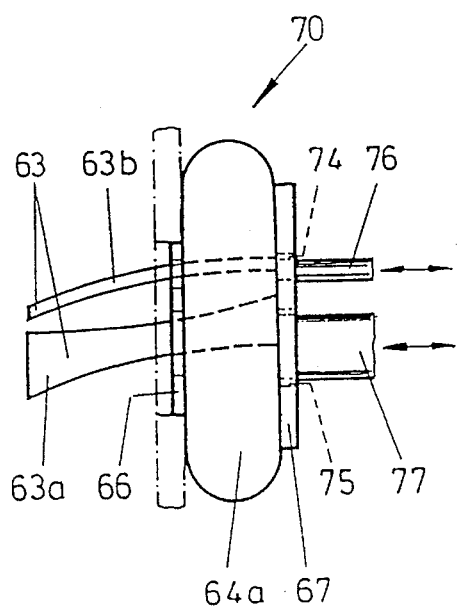
FIG. 12 is a diagrammatic lateral view of the same dissociating means according to FIG. 11 with partly removed bones.
Figure 15:
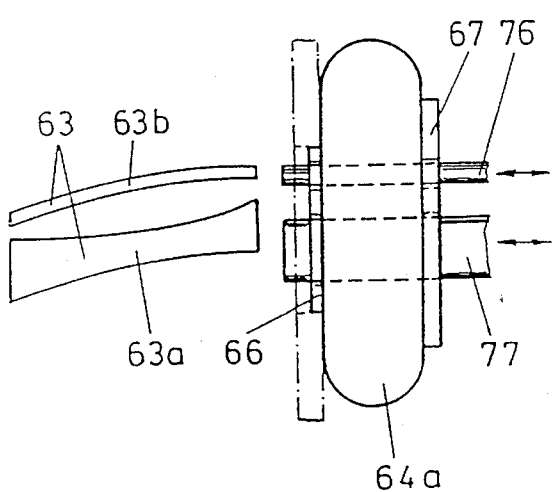
FIG. 15 is a diagrammatic lateral view on the same perforated plates that are movable relative to each other and illustrated in FIGS. 11 and 13, with ulna and radius being ejected and the meat being in a compressed state.

These divided perforated plates (66a, 66b) may also include three holes, so that all three bones (62, 63a, 63b) can be pressed through these divided perforated plates (66a, 66b) together with the rams (76–78), depicted and illustrated in FIGS. 12, 15, in this way and at the same time. The severed meat is here also compressed and the movable perforated plate (67) forms the abutment.

A divided perforated plate (66a, 66b) of this type may first retain the wings (60, 61) as a separate fixing clamp instead of a reception pocket (65) during processing (severing of joint (64) and of bone balls (79, 81)).

We claim:

1. An apparatus for boning appendages of poultry or the like, comprising:
   a cutting station, comprising at least two means for cutting the bones in said appendages in a direction substantially transverse to the longitudinal axes of said bones on opposite sides of a joint in said appendages to remove said joint;

a separating station, comprising means for separating meat from said bones by pushing the bones from said meat;

means for transporting said appendages through said cutting and separating stations; and means for holding said appendages arranged on said transporting means, said holding means comprising respective transverse reception means for holding said appendages on opposing sides of said joint and spaced sufficiently apart so that said cutting blades can pass between said holding means while cutting said joint.

2. An apparatus according to claim 1, wherein said holding means comprises at least one reception pocket having a generally U-shaped cross-section orientated such that the longitudinal length of said bones pass between upright portions of the U-shaped cross-section, said reception pocket being rotatably or pivotably mounted on said transporting means to form said transverse reception means.

3. An apparatus according to claim 2, having two of said reception pockets and further comprising a vertical centering and holding mandrel projecting between said reception pockets.

4. An apparatus as defined in claim 2, wherein said cutting and separating stations are located at the same place in said apparatus.

5. An apparatus as defined in claim 2, wherein said cutting and operating stations are arranged sequentially in said apparatus.

6. An apparatus according to claim 2, further comprising means for retaining said appendage in said holding means, said retaining means comprising a movable strip arranged above said reception pocket.

7. An apparatus according to claim 1, wherein said cutting means comprises two cutting or sawing disks, that rotate in parallel or at an angle relative to each other.

8. An apparatus according to claim 1, wherein said cutting means is displaceably mounted in a direction transverse to the direction of passage.

9. An apparatus according claim 1, further comprising means for gripping said bone, said gripping means comprising a pair of arms that are pivotably mounted relative to each other.

10. An apparatus according to claim 1, wherein said separating station comprises a plurality of knives pivotably mounted for engaging said bone to disassociate the meat therefrom.

11. An apparatus according to claim 10, wherein said knives are mounted in slit-shaped reception means containing a spring so that said knives are displaceably movable therein.

12. An apparatus according to claim 10, wherein a plurality of separating knives are disposed opposite each other in the same plane.

13. An apparatus according to claim 1, further comprising lateral stops for defining the outwardly directed movement of a severed bone part.

14. An apparatus according to claim 1, wherein said separating station comprises at least one perforated plate, provided with stripping edges for pressing bone parts out of the meat.

15. An apparatus according to claim 1, wherein said separating station comprises a plurality of perforated plates that are movable relative to each other and have holes corresponding to the diameters of said bones, and at least one means for pressing said bones through said holes.

16. An apparatus according to claim 15, wherein a displaceable perforated plate is pivotably mounted next to a stationary perforated plate.

17. An apparatus according to claim 11, wherein at least one perforated plate is formed as a divided perforated plate.

18. An apparatus according to claim 17, wherein said divided perforated plate is formed with three holes as a clamp.

19. An apparatus according to claim 15 or 16, further comprising ramming means, movably mounted to slide through said holes.

20. An apparatus according to claim 16, wherein said stationary perforated plate is equipped with tubes for guiding the removed bones.

21. An apparatus for deboning animal extremities, comprising:

means for transporting said extremity;

means for cutting the bones of said extremity in a direction transverse to their longitudinal axes and on opposite sides of a joint in said extremity to allow removal of said joint; holding means cooperating with said transportating means to hold said extremity in said transverse orientation while moving the extremity through said cutting means, said holding means holding said extremity at locations spaced sufficiently apart so that said cutting means can pass between said holding means when said joint is cut; and means for removing cut bones from said extremity substantially in the direction of said axes by pushing the bones.

22. An apparatus according to claim 21, wherein said removing means comprises:

means for retaining meat associated with said bones; and means for pulling said bones therefrom.

23. An apparatus for boning poultry extremities, comprising:

a cutting station, comprising at least two cutting knives positioned to cut the bones in said extremities in a direction substantially transverse to the longitudinal axes of said bones adjacent to and on opposite sides of a joint in said extremities;

a separating station, for separating meat from said bones by pulling the bones from said meat using a plurality of arms that are pivotably mounted relative to each other and positioned to grip an end of said bone;

a conveyor to transport said extremities through said cutting and separating stations; and a holding device for holding said poultry extremities on the conveyor in said transverse orientation relative to the cutting knives, said holding device having at least two reception pockets having a generally U-shaped cross-section sized and configured to hold said extremities and orientated such that the longitudinal length of said bones pass between upright portions of the U-shaped cross-section, said pockets being spaced sufficiently apart so that the cutting knives cut said joint between said pockets.

24. An apparatus according to claim 23, wherein said separating station comprises a plurality of knives pivotably mounted and positioned to engage said bone to disassociate the meat therefrom, said knives being mounted in receptacles containing a spring so that said knives are resiliently urged toward said poultry bone.

25. A method of boning appendages of poultry, comprising the steps of:

cutting said appendage in a direction substantially transverse to the longitudinal axes of said bones on both sides of a joint in said appendage to sever and remove said joint, and to sever and remove ends of said appendage distal from said joint;

holding said appendage in a reception pocket between two opposing plates having apertures therein with which the bones in said appendage are aligned, said apertures being sized to allow passage of said bones but not of the meat;

moving at least one of said plates toward the opposing plate to push said bones through at least one of said apertures aligned therewith;

extending an elongated member through at least one of said apertures and through said meat to push said bone aligned with said aperture out of said meat.

26. A method of boning appendages of poultry as defined in claim 25, comprising the further steps of bending said appendage about said joint to form a V-shaped configuration for said cutting step.

27. A method of boning appendages of poultry as defined in claim 26, wherein said cutting step is performed by two cutting blades one of which severs the joint from the appendage, and one of which severs said distal ends of said appendages.

28. A method of boning appendages of poultry as defined in claim 25, comprising the further step of limiting the movement of at least one of said plates to define the movement of said severed bones extending through said apertures.

29. A method of boning appendages of poultry as defined in claim 25, comprising the further step of providing stripping edges about at least one of said apertures.

30. A method of boning appendages of poultry as defined in claim 25, comprising the further step of providing tubes on one of said plates to guide the removed bones.

31. A method of boning appendages of poultry as defined in claim 25, wherein during said cutting step, said appendage is held in a V-shaped configuration by a divided perforated plate having three holes which are sized and aligned to clamp around three bones in said appendage.

32. An apparatus for boning appendages of poultry, comprising:

a cutting station, comprising at least two means for cutting the bones in said appendages in a direction substantially transverse to the longitudinal axes of said bones on opposite sides of a joint in said appendages to remove said joint;

a separating station, comprising means for separating meat from said bones by pushing the bones from said meat;

means for transporting said appendages through said cutting and separating stations; and means for transporting said appendages through said cutting and separating stations; and means for holding said appendages arranged on said transporting means, said holding means comprising respective transverse reception means for holding said appendages in said transverse orientation, and further comprising at least one reception pocket having a generally U-shaped cross-section orientated such that the longitudinal length of said bones pass between upright portions of the U-shaped cross-section.

33. An apparatus for deboning animal extremities, comprising:

means for transporting said extremity;

means for cutting the bones of said extremity in a direction transverse to their longitudinal axes and on opposite sides of a joint in said extremity to allow removal of said joint;

holding means cooperating with said transporting means to hold said extremity in said transverse orientation during said cutting on opposite sides of said joint, said holding means comprising at least one reception pocket having a generally U-shaped cross-section orientated such that the longitudinal length of said bones pass between upright portions of the U-shaped cross-section; and means for removing cut bones from said extremity substantially in the direction of said axes by pushing the bones.

\* \* \* \* \*

UNITED STATES PATENT AND TRADEMARK OFFICE
CERTIFICATE OF CORRECTION

PATENT NO. : 5,494,479
DATED : Feb. 27, 1996
INVENTOR(S) : Lindert, et al.

It is certified that error appears in the above-indentified patent and that said Letters Patent is hereby corrected as shown below:

Column 9, line 29, change "and operating stations" to --and separating stations--

Column 12, lines 11-12, delete as being redundant

Signed and Sealed this

Thirteenth Day of August, 1996

Attest:

BRUCE LEHMAN

Attesting Officer

Commissioner of Patents and Trademarks